(12) United States Patent
Bezawada et al.

(10) Patent No.: US 11,057,122 B1
(45) Date of Patent: Jul. 6, 2021

(54) SYSTEMS AND METHODS FOR HANDGRIP AND CASE DETECTION FOR MULTI-CARRIER WIRELESS SYSTEMS

(71) Applicant: Apple Inc., Cupertino, CA (US)

(72) Inventors: Rajesh Bezawada, San Jose, CA (US); Aditya N. Srivastava, Freemont, CA (US); Harsha Shirahatti, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/923,487

(22) Filed: Jul. 8, 2020

(51) Int. Cl.
  *H04B 17/12* (2015.01)
  *G01S 19/07* (2010.01)
  *H04B 17/10* (2015.01)
  *H04B 17/318* (2015.01)

(52) U.S. Cl.
  CPC ............. *H04B 17/12* (2015.01); *G01S 19/07* (2013.01); *H04B 17/101* (2015.01); *H04B 17/318* (2015.01)

(58) Field of Classification Search
  CPC .... H04B 17/318; H04B 7/0617; H04B 17/12; H04B 7/0695; H04B 17/101; H04B 1/3833; H04B 7/12; H04B 17/102; H04B 17/103; H04B 17/24; H04B 17/336; H04B 1/1027; H04B 7/0413; G01S 19/07
  See application file for complete search history.

(56) References Cited

U.S. PATENT DOCUMENTS

| | | | |
|---|---|---|---|
| 10,312,973 B1* | 6/2019 | Luo | H01Q 1/44 |
| 2015/0372735 A1* | 12/2015 | Chang | H04B 7/0608 375/267 |
| 2016/0025859 A1* | 1/2016 | Basnayake | G04R 20/06 342/357.62 |
| 2017/0025763 A1* | 1/2017 | Wehrmann | H04B 17/29 |
| 2017/0317770 A1* | 11/2017 | Lagnado | G06F 3/167 |
| 2017/0373712 A1* | 12/2017 | Kim | H01Q 3/242 |
| 2020/0127742 A1* | 4/2020 | Seong | H04B 17/102 |

OTHER PUBLICATIONS

Alammouri, A., et al., "Hand Grip Impact on 5G mmWave Mobile Devices", IEEE Access, Special Section on Millimeter-Wave Communications: New Research Trends and Challenges, Ditigal Object Identifier, May 21, 2019 (13 pp).

* cited by examiner

*Primary Examiner* — Khanh C Tran
(74) *Attorney, Agent, or Firm* — Treyz Law Group, P.C.; Tianyi He (57) ABSTRACT

Systems and methods for multi-carrier frequency grip detection are described. For example, a method may include determining a first signal strength of a first signal received using a first antenna from a source device; determining a second signal strength of a second signal received using a second antenna from the source device; comparing the first signal strength with the second signal strength; and detecting a detuned condition for a device including the first antenna and the second antenna based on the comparison of the first signal strength with the second signal strength.

24 Claims, 6 Drawing Sheets

SYSTEMS AND METHODS FOR HANDGRIP AND CASE DETECTION FOR MULTI-CARRIER WIRELESS SYSTEMS

TECHNICAL FIELD

This disclosure relates to multi-carrier frequency grip detection and case detection.

BACKGROUND

The effects of the user hand grip on the design of 5G millimeter-wave mobile handsets have been studied, specifically in terms of the antenna module placement and the beamforming codebook. The loss from hand blockage on the antenna gains can be up to 20-25 dB, which implies that the possible hand grip profiles may be considered while designing the antenna module placement and beamforming codebook.

SUMMARY

Disclosed herein are implementations of multi-carrier frequency grip detection and case detection.

In a first aspect, the subject matter described in this specification can be embodied in handheld computing devices that include a first antenna, a second antenna, and a processing apparatus configured to determine a first signal strength of a first signal received using the first antenna from a source device; determine a second signal strength of a second signal received using the second antenna from the source device; compare the first signal strength with the second signal strength; and detect a grip condition for a device including the first antenna and the second antenna based on the comparison of the first signal strength with the second signal strength.

In a second aspect, the subject matter described in this specification can be embodied in methods that include determining a first signal strength of a first signal received using a first antenna from a source device; determining a second signal strength of a second signal received using a second antenna from the source device; comparing the first signal strength with the second signal strength; and detecting a detuned condition for a device including the first antenna and the second antenna based on the comparison of the first signal strength with the second signal strength.

In a third aspect, the subject matter described in this specification can be embodied in systems that include a first antenna, a second antenna, and a processing apparatus configured to determine a first signal strength of a first signal received using the first antenna from a source device; determine a second signal strength of a second signal received using the second antenna from the source device; compare the first signal strength with the second signal strength; and detect a detuned condition for a device including the first antenna and the second antenna based on the comparison of the first signal strength with the second signal strength.

BRIEF DESCRIPTION OF THE DRAWINGS

Described herein are systems and methods for multi-carrier frequency grip detection.

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Described herein are systems and methods for multi-carrier frequency grip detection and case detection. For example, hand grip of a device (e.g., a smartphone or a tablet), which supports multi-frequency global navigation satellite system (GNSS) bands, may be detected. In some designs for GNSS devices, a first antenna (e.g., an upper antenna) is used to receive L1 signals while a second antenna (e.g., a lower antenna) is used to receive L5 signals. For example, L5 signals may be received by an antenna positioned at a location close to where a user often grips a device. As a result, antenna efficiency for receiving L5 signals may degrade more significantly when a user grips the device with their hand. For GNSS use cases a device cannot transmit in the specified frequency band, since GNSS is protocol where user devices only receive, thus grip detection algorithms for cellular technology that utilize transmissions by the gripped device do not work for GNSS use cases. Techniques are proposed herein which can detect grip conditions for GNSS use cases using GNSS carrier-to-noise density ratio (C/N0), WiFi received signal strength indicator (RSSI), and/or Bluetooth RSSI. This information can further be used to tune an antenna accordingly in free space and grip conditions, with or without a case on the device. The techniques may also provide high confidence "grip" context notification for motion and context-based algorithms.

For example, grip detection for multi-frequency GNSS bands may be performed using inputs, such as, carrier-to-noise density ratio (C/N0) measurements for GNSS L1/L5 supported constellations (e.g., GPS, GAL, QZSS, and BDS); WiFi and/or Bluetooth received signal strength indicator (RSSI) measurements from diversity antennas; motion context, including device mount state (e.g., mounted/unmounted) and user activity state (e.g., driving, walking, or cycling); and/or radio frequency (RF) signal context, including signal environment classifications (e.g., benign, foliage, urban, or dense urban).

For example, grip detection for multi-frequency GNSS bands may be performed at selected times to conserve energy on the device and reduce false positives. In some implementations, grip detection is performed only when in a grip detection mode, and suspended when not in the grip detection mode. The grip detection mode may be entered when certain criteria are met and exited when other criteria are met. For example, the grip detection mode entry criteria may include: when an activity state is "Driving", a mount state should switch to "Unmounted", or when activity state is not "Driving" (e.g.: Walking, Running, or Cycling). For example, the grip detection mode exit criteria may include: mount state is "Mounted" when activity state is "Driving", or a GNSS session is ended.

The techniques may exploit the fact that L1 & L5 signals are being transmitted from the same satellite by design. This feature may be used to detect hand grip conditions. For example, the signal strengths of L1 & L5 may be monitored. In some implementations, using the antenna diversity and known deltas per product, the deltas may be compared to a known threshold. If delta is >>threshold, then a hand grip condition may be detected. Other known interference which can affect the signal strength deltas have significantly less impact than hand grip conditions. This may be accounted for in the threshold as well. In some implementations, a back-off timer is used to go from current free space tuner state to handgrip, introducing some hysteresis. However, in some implementations, a switch to free space tuner condition may be performed immediately once a no hand grip condition is detected. This back-off timer (e.g., 5 seconds) may help to build confidence that the user is indeed gripping the device. However, it may be advantageous to stay in a free space condition as often as possible, so a system may be configured to switch back immediately when a hand grip condition is no longer detected. Using motion context, the back-off timer can be changed on the fly. For example, for a "Drive" motion state, the back-off timer may be set to 10 seconds, whereas for a "Walk" motion state, the back-off timer may be set to 5 seconds because the probability of hand grip is higher (empirically) in walk use case vs drive. A similar concept can be extended to WiFi and Bluetooth RSSI measurements, or any other radio frequency beacons which have the same source of transmission with multiple bands of frequencies. For example, a delta of WiFi RSSI measured on diversity antennas may be computed. If the delta>>threshold, then a hand grip condition may be detected.

In some implementations, an antenna may have its tuning state altered in response to detection of a grip condition. For example, based on grip condition or free space condition, a device may switch to a corresponding antenna tuning state for the L5 frequency band, or turn L5 off to conserve battery. Hysteresis based on a back-off timer may also be used, which may make the solution stable and not rapidly transitioning from one state to another.

Some implementations of the systems and methods describe herein may provide advantages, such as, reliable and accurate detection of grip conditions indicating a user hand is holding a device (e.g., a smartphone or tablet), reliable and accurate detection of case conditions indicating a device (e.g., a smartphone or tablet) is being used in a case, enhanced tuning of antennas based on detection of grip conditions or other detuned conditions to better support applications (e.g., GNSS based navigation) using multi-carrier frequencies.

Figure 1:
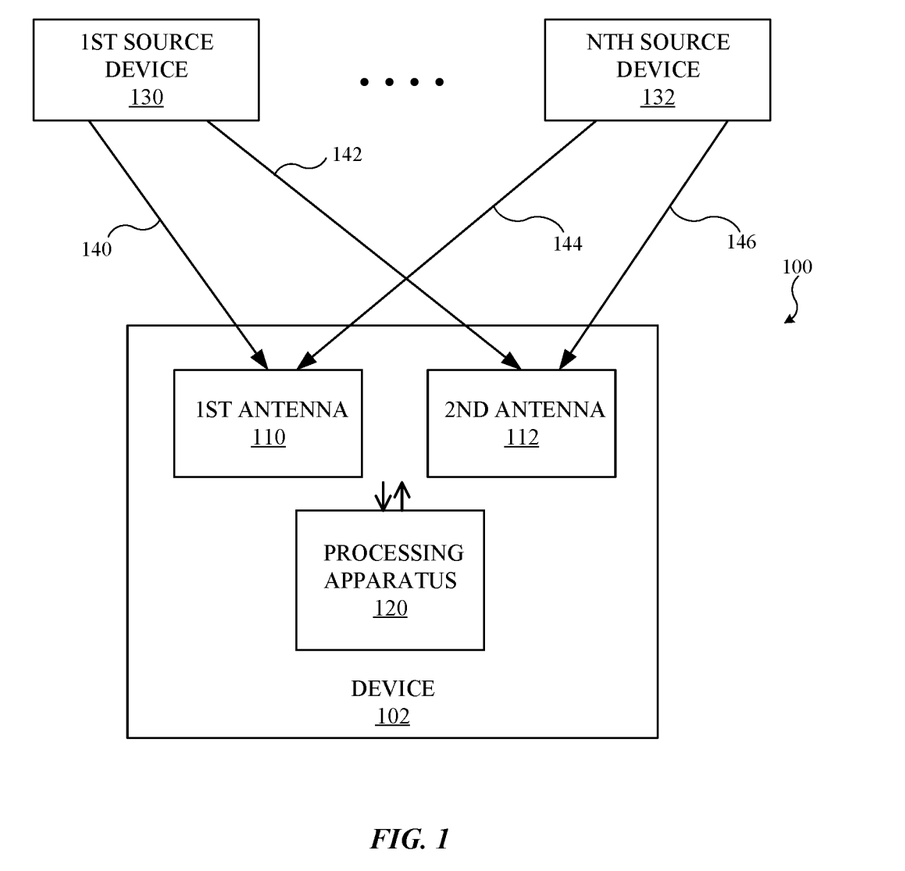
FIG. 1 is a block diagram of an example of a system for multi-carrier frequency grip detection.

FIG. 1 is a block diagram of an example of a system 100 for multi-carrier frequency grip detection. The system 100 includes a device 102, which includes a first antenna 110, a second antenna 112, and a processing apparatus 120. The device 102 is configured to compare the signal strengths of different signals from a common source that are respectively received using the first antenna 110 and the second antenna 112 in order to detect a detuned condition, which may be indicative of a grip condition corresponding to a user holding the device 102 in their hand. The system 100 interacts with one or more source devices, including a first source device 130 and an Nth source device 132. The first source device 130 transmits a first signal 140 that is received by the device 102 using the first antenna 110. The first source device 130 also transmits a second signal 142 that is received by the device 102 using the second antenna 112. Similarly, the Nth source device 132 transmits a first signal 144 that is received by the device 102 using the first antenna 110. The Nth source device 132 also transmits a second signal 146 that is received by the device 102 using the second antenna 112. In some implementations, signal strengths received from a common source device are compared for multiple source devices to more reliably detect a detuned condition (e.g., a grip condition) of the device 102. For example, the device 102 may implement the process 200 of FIG. 2. For example, the device 102 may implement the process 300 of FIG. 3. For example, the device 102 may implement the process 400 of FIG. 4. For example, the device 102 may implement the process 500 of FIG. 5. For example, the device 102 may implement the process 600 of FIG. 6.

The system 100 includes a device 102, which may be handheld computing device (e.g., a smartphone or a tablet). The device 102 may support applications, such as, navigation using a global navigation satellite system (GNSS), that utilize multiple signals on different carrier frequencies that are received from a common source device (e.g., a satellite or a wireless network access point) using different antennas of the device 102. From time to time the device 102 may be gripped by a hand of user (e.g., to carry the device 102 or interact with a touchscreen of the device 102).

The system 100 interacts with a first source device 130. The first source device 130 is configured to transmit a first signal 140 at a first carrier frequency. The first signal 140 may be received by the device 102 using the first antenna 110. The first source device 130 also is configured to transmit a second signal 142 at a second carrier frequency. The second signal 142 may be received by the device 102 using the second antenna 112. For example, the first source device 130 may be a satellite of a global navigation satellite system (e.g., Global Positioning System (GPS), Global Navigation Satellite System (GLONASS), Galileo, or BeiDou). In some implementations, the first signal 140 is an L1 signal of the global navigation satellite system and the second signal 142 is an L5 signal of the global navigation satellite system. For example, the source device may be an access point of a wireless communications network (e.g., a WiFi network or a Bluetooth network).

In this example, the system 100 interacts with multiple source devices (e.g., GNSS satellites, WiFi access points, or Bluetooth devices) including the first source device 130 and an Nth source device 132. Similarly, the Nth source device 132 is configured to transmit a first signal 144 at the first carrier frequency. The first signal 144 may be received by the device 102 using the first antenna 110. The Nth source device 132 also is configured to transmit a second signal 146 at a second carrier frequency. The second signal 146 may be received by the device 102 using the second antenna 112. In some implementations, the received signal strength of different signals from a given common source device may be compared for multiple source devices to more reliably detect detuned conditions (e.g., a grip condition) of an antenna of the device 102. For example, the first signal 140 and the second signal 142 from the first source device 130 as well as the first signal 144 and the second signal 146 from the Nth source device 132 may be encoded using code division multiple access (CDMA) scheme to distinguish signals from different source devices.

The device 102 includes a first antenna 110. For example, the first antenna 110 may be tuned to receive signals at a first carrier frequency (e.g., 1575.42 MHz for L1 signals in a GNSS system or 2.4 GHz for a WiFi network). The device 102 includes a second antenna 112. For example, the second antenna 112 may be tuned to receive signals at a second carrier frequency (e.g., 1176.45 MHz for L5 signals in a GNSS system or 5 GHz for a WiFi network). The first antenna and the second antenna may be positioned apart from each other within the device 102 to achieve some spatial diversity for reception. In some implementations, the first antenna 110 and/or the second antenna 112 may be retuned (e.g., by selecting an alternative tuning network on a circuit board of the device 102) to reuse an antenna for another application in time sharing scheme. For example, the second antenna 112 may be tuned to receive L5 signals from GNSS satellites in a first mode and tuned to receive cellular network data signals in a second mode. In some implementations, the first antenna 110 and/or the second antenna 112 may have their tuning adjusted (e.g., by selecting an alternative tuning network on a circuit board of the device 102 or adjusting an impedance of one or more elements in a tuning network) to mitigate a detuned state (e.g., a detuned state caused by a user gripping the device 102).

The device 102 includes a processing apparatus 120, which may be configured to control various components of the device 102. For example, the processing apparatus 120 may implement a navigation application using a GNSS. For example, the processing apparatus 120 may implement applications using a WiFi network or Bluetooth. The processing apparatus 120 is operable to execute instructions that have been stored in a data storage device. In some implementations, the processing apparatus 120 is a processor with random access memory for temporarily storing instructions read from a data storage device while the instructions are being executed. The processing apparatus 120 may include single or multiple processors each having single or multiple processing cores. For example, the processing apparatus 120 may include a microprocessor or a microcontroller. Alternatively, the processing apparatus 120 may include another type of device, or multiple devices, capable of manipulating or processing data. For example, the data storage device may be a non-volatile information storage device such as a hard drive, a solid-state drive, a read-only memory device (ROM), or any other suitable type of storage device such as a non-transitory computer readable memory. The data storage device may include another type of device, or multiple devices, capable of storing data for retrieval or processing by the processing apparatus 120. For example, a data storage device of the processing apparatus 120 may store instructions executable by the processing apparatus 120 that upon execution by the processing apparatus 120 cause the processing apparatus 120 to perform operations to implement one or more processes described herein. The processing apparatus 120 may include one or more input/output interfaces (e.g., serial ports) for controlling other components of the device 102, including the first antenna 110 and the second antenna and associated tuning networks, and/or external devices. For example, the processing apparatus 120 may be configured to alter a tuning state of the second antenna 112 by selecting or adjusting a tuning network on a circuit board of the device 102.

The processing apparatus 120 may be configured to determine a first signal strength of the first signal 140 received using the first antenna 110 from a source device (e.g., the first source device 130); determine a second signal strength of a second signal 142 received using the second antenna 112 from the source device; compare the first signal strength with the second signal strength; and detect a detuned condition (e.g., a grip condition) for the device 102 including the first antenna 110 and the second antenna 112 based on the comparison of the first signal strength with the second signal strength. For example, the first signal strength and the second signal strength may be determined as carrier-to-noise density ratios (C/N0) or as signal-to-noise ratios (SNR). For example, comparing the first signal strength with the second signal strength may include determining a ratio (e.g., as a difference between the signal strengths in a logarithmic scale) between the first signal strength and the second signal strength. For example, comparing the first signal strength with the second signal strength may include determining a difference between the first signal strength and the second signal strength. In some implementations, comparing the first signal strength with the second signal strength includes subtracting, in a logarithmic scale, a signal strength offset from a difference of the first signal strength and the second signal strength. For example, the signal strength offset may correspond to an expected difference in received signal strength for the first signal 140 and second signal 142 for the device 102. For example, where the first source device is a GNSS satellite, the first signal 140 is an L1 signal, and the second signal an L5 signal, comparing the first signal strength with the second signal strength may include computing:

$$cn0\_L1L5Delta\_Satellite\_k = cn0\_L5\_Satellite\_k - cn0\_L1\_Satellite\_k - cn0\_Offset$$

where cn0_L1L5Delta_Satellite_k is C/N0 delta in dB between L1 and L5 signals for satellite k, cn0_L5 Satellite k is C/N0 of L5 signal for satellite k, cn0_L1 Satellite k is C/N0 of L1 signal for satellite k, and cn0 Offset is a sum of configurable constant parameters for a device type, such as, l115ReceiverAntennaEfficiencyDelta (i.e., receiver L1 and L5 antenna efficiency delta) and l115TransmissionDelta (i.e., L1 and L5 expected C/N0 delta in open sky published by corresponding constellation authorities). For example, detecting a detuned condition may include checking whether the comparison of the first signal strength with the second signal strength crosses a threshold. In some implementations, the detuned condition detected is a grip condition that indicates that a human hand is holding the device 102 (e.g., a handheld computing device). For example, a threshold used to detect the detuned condition may be selected to correspond to a significant level of detuning that has been empirically associated with a user gripping the device 102.

In some implementations, the processing apparatus 120 is configured to compare the received signal strength of different signals from a given common source device for multiple source devices to more reliably detect detuned conditions (e.g., a grip condition) of an antenna of the device 102. For example, the processing apparatus 120 may be configured to determine a third signal strength of a third signal (e.g., the first signal 144) received using the first antenna 110 from a second source device (e.g., the Nth source device 132); determine a fourth signal strength of a fourth signal (e.g., the second signal 146) received using the second antenna 112 from the second source device; compare the third signal strength with the fourth signal strength; and detect the grip condition for the device 102 including the first antenna 110 and the second antenna 112 based on the comparison of the third signal strength with the fourth signal strength. In some implementations, signal strengths may be compared for more than two source devices to detect a detuned condition. In some implementations, the number of source devices used to detect a detuned condition (e.g., a grip condition) is modulated based on a classification of a radio frequency environment. For example, the processing apparatus 120 may be configured to determine a classification (e.g., benign or challenging) of a radio frequency environment of the device 102; and adjust, based on the classification of the radio frequency environment, a number of source devices for which signal strengths are compared to detect the grip condition.

For example, where the first source device is a GNSS satellite, the first signal 140 is an L1 signal, and the second signal an L5 signal, a grip condition may be detected if:

$$abs(cn0\_L1L5\text{Delta\_Satellite}\_k) > cn0\_\text{delta\_threshold}$$

for at least min_sv_count satellites above a minimum elevation angle, where cn0 delta threshold is a threshold. For example, the cn0 delta threshold may be 3 dB-Hz. For example, min_sv_count may be 4 in benign radio frequency signal environments and 2 in other environment types (e.g., dense urban environment). For example, the minimum elevation angle for satellites to be considered may be 60 degrees. In some implementations, if an L5 signal from a satellite is not tracking when the corresponding L1 signal indicates that it should be tracked, this can be treated as a comparison for the corresponding satellite that exceeds the threshold.

The processing apparatus 120 may be configured to implement hysteresis in a detector for the detuned condition (e.g., a grip condition). For example, the processing apparatus 120 may be configured to detect the grip condition of the device 102 including the first antenna 110 and the second antenna 112 based on multiple comparisons of signal strength of the first signal 140 with the second signal 142 performed over a window of time (e.g., 1 second, 2 seconds, 5 seconds, or 10 seconds). In some implementations, a level of hysteresis in a grip condition detector may be modulated based on an activity state (e.g., walking, running, driving, or resting) determined for the device 102. For example, the processing apparatus 120 may be configured to determine an activity state of the device 102 including the first antenna 110 and the second antenna 112; and adjust a duration of the window of time based on the activity state.

In some implementations, a process for detecting a detuned condition (e.g., a grip condition) is selectively performed based on an activity state of the device 102, which may help to conserve power usage in the device 102 and reduce false positives of the detector by avoiding running the detector in activity states for which the detuned condition is unlikely. For example, the first signal strength and the second signal strength may be compared responsive to being in a grip detection mode that is entered based on an activity state of the device 102. For example, the processing apparatus 120 may be configured to determine an activity state of the device including the first antenna and the second antenna; and enter a grip detection mode based on the activity state. For example, the processing apparatus 120 may be configured to implement the process 400 of FIG. 4 to enter the grip detection mode. For example, the processing apparatus 120 may be configured to implement the process 500 of FIG. 5 to exit the grip detection mode.

The processing apparatus 120 may be configured to perform an action responsive to a detected detuned condition (e.g., a grip condition). For example, the processing apparatus 120 may be configured to, responsive to detection of the grip condition, alter a tuning state of the second antenna 112. For example, the tuning state may be altered by disabling reception of the second signal 142 using the second antenna 112, which may provide the benefit of saving power on the device 102 or freeing up the second antenna 112 for use by other applications (e.g., cellular network data transfer) that may contend for use of the second antenna 112. For example, the processing apparatus 120 may be configured to, perform another application specific action responsive to the detuned condition, such as altering a display in response to a grip condition. In some implementations, feedback to a user may be generated in a user interface (UI) of the device 102 to prompt the user to grip the device 102 in different way (e.g., to enhance a user experience).

One or more parameters of a detuned condition detector (e.g., a grip detector) implemented by the processing apparatus may be updated to adapt to the circumstances of the device 102 as an individual device. For example, the tuning characteristics of the device 102 may be impacted by variable factors, such as, whether a user keeps the device 102 in a case and/or manufacturing tolerances of the device. For example, where comparing the first signal strength to the second signal strength includes subtracting, on a logarithmic scale, an offset (e.g., a C/N0 offset) associated with the device 102 from a difference of the first signal strength and the second signal strength, the processing apparatus 120 may be configured to update the offset associated with the device 102 including the first antenna 110 and the second antenna 112 based on measurements of signal strength of the first signal and the second signal taken during a tuned condition (e.g., a free space condition) that is mutually exclusive with the grip condition. For example, the processing apparatus 120 may implement the process 600 of FIG. 6 to adapt an offset of the detector. For example, a threshold of the detector may be adapted in a similar manner. In some implementations, the processing apparatus 120 may be configured to detect whether the device is in a case based on measurements used to adapt parameters of the detector.

Figure 2:
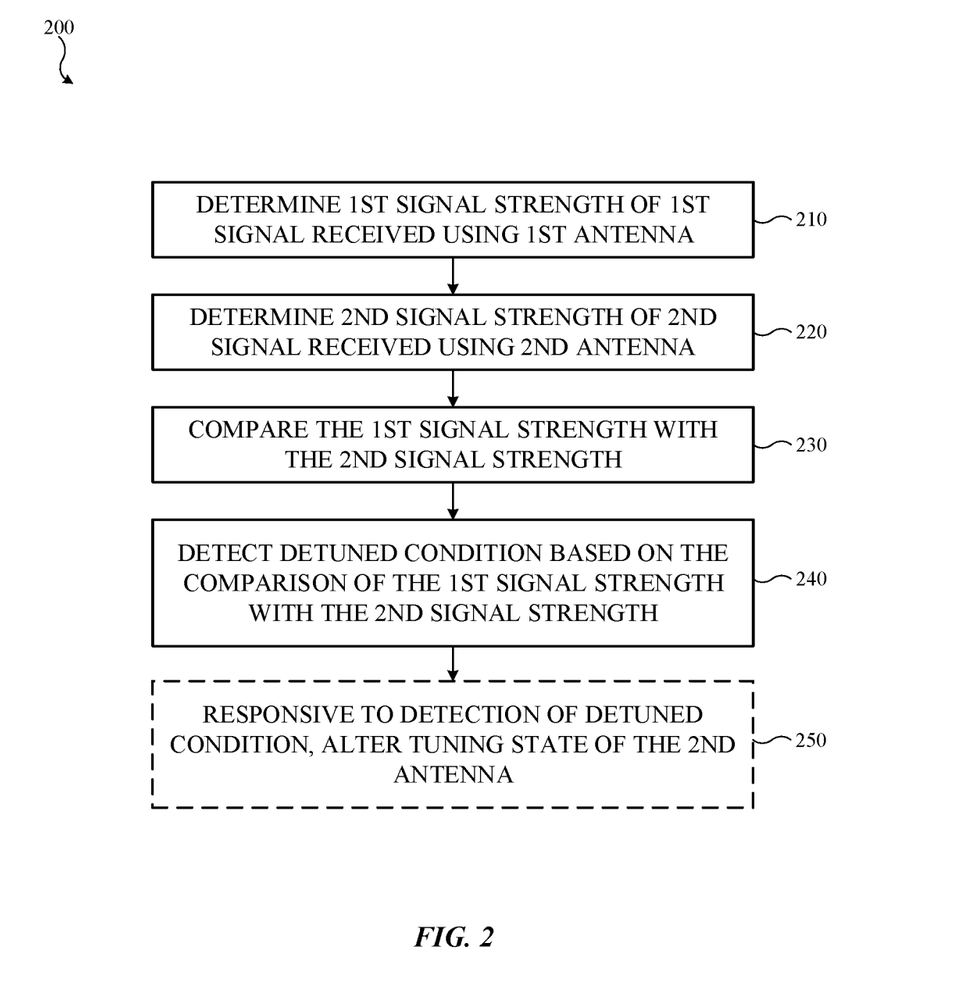
FIG. 2 is a flow chart of an example of a process for multi-carrier frequency grip detection.

FIG. 2 is a flow chart of an example of a process 200 for multi-carrier frequency grip detection. The process 200 includes determining 210 a first signal strength of a first signal received using a first antenna from a source device; determining 220 a second signal strength of a second signal received using a second antenna from the source device; comparing 230 the first signal strength with the second signal strength; detecting 240 a detuned condition for a device including the first antenna and the second antenna based on the comparison of the first signal strength with the second signal strength; and, responsive to detection of the detuned condition, altering 250 a tuning state of the second antenna. For example, the process 200 may be implemented using the device 102 of FIG. 1.

The process 200 includes determining 210 a first signal strength of a first signal received using a first antenna from a source device. For example, the source device may be a satellite of a global navigation satellite system. For example, the source device may be an access point of a wireless communications network (e.g., a WiFi network or a Bluetooth network). For example, the first signal strength may be determined 210 as a carrier-to-noise density ratio (C/N0) or as a signal-to-noise ratio (SNR). For example, the first signal strength may be determined 210 as a received signal strength indicator (RSSI). In some implementations, the first signal strength is determined 210 using a receiver module (e.g., a GNSS receiver).

The process 200 includes determining 220 a second signal strength of a second signal received using a second antenna from the source device. For example, the first antenna may be tuned to receive signals at a first carrier frequency (e.g., 1575.42 MHz for L1 signals in a GNSS system or 2.4 GHz for a WiFi network), while the second antenna may be tuned to receive signals at a second carrier frequency (e.g., 1176.45 MHz for L5 signals in a GNSS system or 5 GHz for a WiFi network). The first antenna and the second antenna may be positioned apart from each other within a device (e.g., a handheld computing device such as a smartphone or a tablet). For example, the first signal may be an L1 signal of the global navigation satellite system and the second signal may be an L5 signal of the global navigation satellite system. For example, the second signal strength may be determined 220 as a carrier-to-noise density ratio (C/N0) or as a signal-to-noise ratio (SNR). For example, the second signal strength may be determined 220 as a received signal strength indicator (RSSI). In some implementations, the second signal strength is determined 220 using a receiver module (e.g., a GPS receiver).

Figure 6:
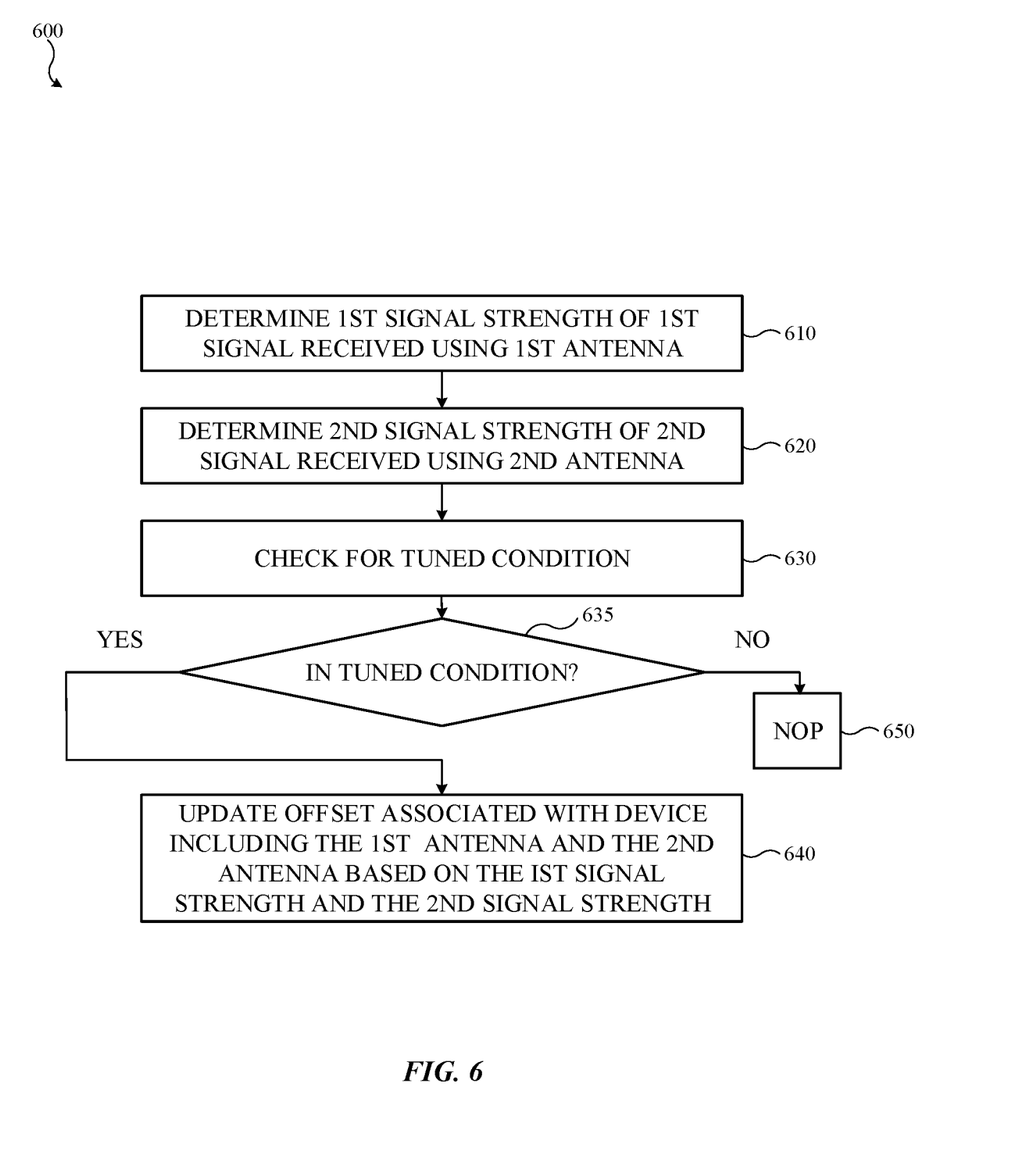
FIG. 6 is a flow chart of an example of a process for updating a signal strength offset parameter for a device including two antennas.

The process 200 includes comparing 230 the first signal strength with the second signal strength. For example, comparing 230 the first signal strength with the second signal strength may include determining a ratio (e.g., as a difference between the signal strengths in a logarithmic scale) between the first signal strength and the second signal strength. For example, comparing 230 the first signal strength with the second signal strength may include determining a difference between the first signal strength and the second signal strength. In some implementations, comparing 230 the first signal strength with the second signal strength includes subtracting, in a logarithmic scale, a signal strength offset from a difference of the first signal strength and the second signal strength. For example, the signal strength offset may correspond to an expected difference in received signal strength for the first signal and second signal for the device (e.g., a handheld computing device). For example, where the first source device is a GNSS satellite, the first signal is an L1 signal, and the second signal an L5 signal, comparing 230 the first signal strength with the second signal strength may include computing:

$$cn0\_L1L5Delta\_Satellite\_k = cn0\_L5\_Satellite\_k - cn0\_L1\_Satellite\_k - cn0\_Offset$$

where $cn0\_L1L5Delta\_Satellite\_k$ is C/N0 delta in dB between L1 and L5 signals for satellite k, $cn0\_L5$ Satellite k is C/N0 of L5 signal for satellite k, $cn0\_L1$ Satellite k is C/N0 of L1 signal for satellite k, and cn0 Offset is a sum of configurable constant parameters for a device type, such as, l1l5ReceiverAntennaEfficiencyDelta (i.e., receiver L1 and L5 antenna efficiency delta) and l1l5TransmissionDelta (i.e., L1 and L5 expected C/N0 delta in open sky published by corresponding constellation authorities). In some implementations, the C/N0 offset may be adapted for a particular device by implementing the process 600 of FIG. 6.

The process 200 includes detecting 240 a detuned condition for a device (e.g., the device 102) including the first antenna and the second antenna based on the comparison of the first signal strength with the second signal strength. For example, detecting 240 a detuned condition may include checking whether the comparison of the first signal strength with the second signal strength crosses a threshold. In some implementations, the detuned condition is a grip condition indicating that a human hand is holding the device (e.g., a handheld computing device) including the first antenna and the second antenna. For example, a threshold used to detect the detuned condition may be selected to correspond to a significant level of detuning that has been empirically associated with a user gripping the device.

Detecting 240 a detuned condition for the device may include implementing hysteresis in a detector for the detuned condition (e.g., a grip condition). For example, detecting 240 the detuned condition of the device including the first antenna and the second antenna may be based on multiple comparisons of signal strength of the first signal with the second signal performed over a window of time (e.g., 1 second, 2 seconds, 5 seconds, or 10 seconds). In some implementations, a level of hysteresis in a grip condition detector may be modulated based on an activity state (e.g., walking, running, driving, or resting) determined for the device. For example, detecting 240 the detuned condition of the device (e.g., the device 102) may include determining an activity state of the device including the first antenna and the second antenna; and adjusting a duration of the window of time based on the activity state.

The process 200 includes, responsive to detection of the detuned condition, altering 250 a tuning state of the second antenna (e.g., the first antenna 110 or the second antenna 112). In some implementations, a tuning state of the second antenna may be altered 250 by selecting an alternative tuning network on a circuit board of the device or adjusting an impedance in a tuning network connected to the second antenna. For example, the tuning state may be altered by disabling reception of the second signal using the second antenna. Disabling reception of the second signal using the second antenna may conserve power and or free up the second antenna for use in other applications that contend for time-shared use of the second antenna. For example, the second antenna may be tuned to receive L5 signals from GNSS satellites in a first mode and tuned to receive cellular network data signals in a second mode.

Step 250 of the process 200 is optional. In some implementations, detection of a grip condition may be used for other application specific purposes instead of or in addition to altering 250 the tuning of the second antenna. For example, a user interface of the device may be changed in response to a grip condition. In some implementations, feedback to a user may be generated in a user interface (UI) of a device (e.g., the device 102) to prompt the user to grip the device in different way (e.g., to enhance a user experience).

In some implementations, the process 200 is selectively performed based on an activity state of the device, which may help to conserve power usage in the device and reduce false positives of the detector by avoiding running the detector in activity states for which the detuned condition (e.g., a grip condition) is unlikely. For example, the first signal strength and the second signal strength may be compared 230 responsive to being in a grip detection mode that is entered based on an activity state of the device. For example, the process 400 of FIG. 4 may be implemented to enter a grip detection mode, during which the process 200 is performed. For example, the process 500 of FIG. 5 may be implemented to exit the grip detection mode, ending performance of the process 200 to check for the grip condition, thus saving power and avoiding false positives.

Figure 3:
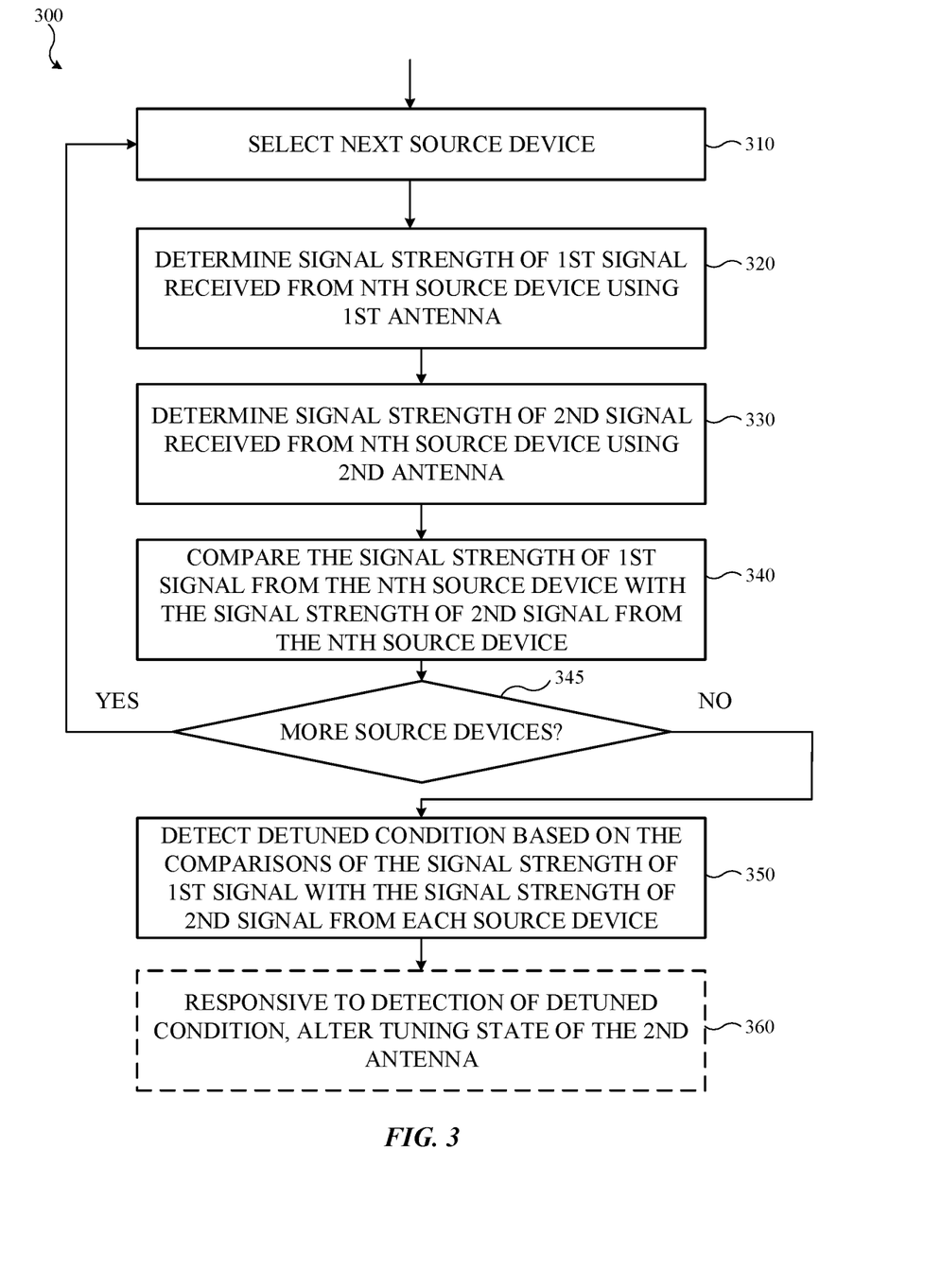
FIG. 3 is a flow chart of an example of a process for multi-carrier frequency grip detection using signals from multiple source devices.

FIG. 3 is a flow chart of an example of a process 300 for multi-carrier frequency grip detection using signals from multiple source devices. The process 300 includes selecting 310 a next source device; determining 320 a first signal strength of a first signal received using a first antenna from an Nth source device; determining 330 a second signal strength of a second signal received using a second antenna from the Nth source device; comparing 340 the first signal strength with the second signal strength; if (at step 345) there is another source device to be processed, selecting 310 the next source device; if (at step 345) all the relevant source device have been processed, detecting 350 a detuned condition for a device including the first antenna and the second antenna based on the comparisons of the first signal strength with the second signal strength for each relevant source device; and, responsive to detection of the detuned condition, altering 360 a tuning state of the second antenna. For example, the process 300 may be implemented using the device 102 of FIG. 1.

The process 300 includes selecting 310 a next source device from among a set of relevant source devices. The set of relevant source devices may include satellites of a global navigation satellite system. For example, the set of relevant source devices may include GNSS satellites that are on an unobstructed line of sight from the position of a device (e.g., the device 102) implementing the process 300 and above a minimum elevation angle (e.g., 60 degrees). In some circumstances (e.g., on an open road) there may be many satellites meeting this criteria and a subset of the source devices may be selected 310 in turn, such as the closest satellites or the satellites with the highest received signal strengths, until a number (e.g., 2 or 4 or 8) of source devices required for detecting 350 a detuned condition (e.g. a grip condition) have been processed. For example, the set of relevant source devices may include access points of a wireless communications network (e.g., a WiFi network or a Bluetooth network). For example, the set of relevant source devices may include WiFi access points that are close enough to the device implementing the process 300 and are transmitting signals with the highest received signal strength at the device.

The process 300 includes determining 320 a first signal strength of a first signal received using a first antenna from the Nth source device that is being processed. For example, the first signal strength may be determined 320 as a carrier-to-noise density ratio (C/N0) or as a signal-to-noise ratio (SNR). For example, the first signal strength may be determined 320 as a received signal strength indicator (RSSI). In some implementations, the first signal strength is determined 320 using a receiver module (e.g., a GPS receiver).

The process 300 includes determining 330 a second signal strength of a second signal received using a second antenna from Nth source device that is being processed. For example, the first antenna may be tuned to receive signals at a first carrier frequency (e.g., 1575.42 MHz for L1 signals in a GNSS system or 2.4 GHz for a WiFi network), while the second antenna may be tuned to receive signals at a second carrier frequency (e.g., 1176.45 MHz for L5 signals in a GNSS system or 5 GHz for a WiFi network). The first antenna and the second antenna may be positioned apart from each other within a device (e.g., a handheld computing device such as a smartphone or a tablet). For example, the first signal may be an L1 signal of the global navigation satellite system and the second signal may be an L5 signal of the global navigation satellite system. For example, the second signal strength may be determined 330 as a carrier-to-noise density ratio (C/N0) or as a signal-to-noise ratio (SNR). For example, the second signal strength may be determined 330 as a received signal strength indicator (RSSI). In some implementations, the second signal strength is determined 330 using a receiver module (e.g., a GPS receiver).

The process 300 includes comparing 340 the first signal strength with the second signal strength for the Nth source device that is being processed. For example, comparing 340 the first signal strength with the second signal strength may include determining a ratio (e.g., as a difference between the signal strengths in a logarithmic scale) between the first signal strength and the second signal strength. For example, comparing 340 the first signal strength with the second signal strength may include determining a difference between the first signal strength and the second signal strength. In some implementations, comparing 340 the first signal strength with the second signal strength includes subtracting, in a logarithmic scale, a signal strength offset from a difference of the first signal strength and the second signal strength. For example, the signal strength offset may correspond to an expected difference in received signal strength for the first signal and second signal for the device (e.g., a handheld computing device). For example, where the first source device is a GNSS satellite, the first signal is an L1 signal, and the second signal an L5 signal, comparing 340 the first signal strength with the second signal strength may include computing:

$$cn0\_L1L5Delta\_Satellite\_k = cn0\_L5\_Satellite\_k - cn0\_L1\_Satellite\_k - cn0\_Offset$$

where cn0_L1L5Delta_Satellite_k is C/N0 delta in dB between L1 and L5 signals for satellite k, cn0_L5 Satellite k is C/N0 of L5 signal for satellite k, cn0_L1 Satellite k is C/N0 of L1 signal for satellite k, and cn0 Offset is a sum of configurable constant parameters for a device type, such as, l115ReceiverAntennaEfficiencyDelta (i.e., receiver L1 and L5 antenna efficiency delta) and l115TransmissionDelta (i.e., L1 and L5 expected C/N0 delta in open sky published by corresponding constellation authorities). In some implementations, the C/N0 offset may be adapted for a particular device by implementing the process 600 of FIG. 6.

One or more parameters of a detuned condition detector (e.g., a grip detector) used to implement the process 300 may be updated to adapt to the circumstances of a device (e.g., the device 102) as an individual device. For example, the tuning characteristics of the device may be impacted by variable factors, such as, whether a user keeps the device in a case and/or manufacturing tolerances of the device. For example, where comparing the first signal strength to the second signal strength includes subtracting, on a logarithmic scale, an offset (e.g., a C/N0 offset) associated with the device from a difference of the first signal strength and the second signal strength, the offset associated with the device may be updated based on measurements of signal strength of the first signal and the second signal taken during a tuned condition (e.g., a free space condition) that is mutually exclusive with the grip condition. For example, the process 600 of FIG. 6 may be implemented to adapt an offset of the detector. For example, a threshold of the detector may be adapted in a similar manner.

If (at step 345) there is another source device to be processed in the set of relevant source devices, selecting 310 the next source device and repeating steps 320, 330 and 340 for that next source device. For example, where a first source device has been processed, the process 300 may include determining 320 a third signal strength of a third signal received using the first antenna from a second source device; determining 330 a fourth signal strength of a fourth signal received using the second antenna from the second source device; and comparing 340 the third signal strength with the fourth signal strength.

When (at step 345) all the relevant source devices have been processed to determine a respective comparison of signal strengths, the process 300 continues by detecting 350 the detuned condition (e.g., a grip condition) based on the respective signal strength comparisons for the relevant source devices. For example, where at least two relevant source devices are considered, the process 300 may include detecting 350 a detuned condition for the device including the first antenna and the second antenna based on the comparison of the first signal strength with the second signal strength (for a first source device); and based on the comparison of the third signal strength with the fourth signal strength (for a second source device). By detecting 350 the detuned condition based on comparisons for multiple source devices, the detuned condition (e.g., a grip condition) may be more reliably detected 350. In some implementations, signal strengths may be compared for more than two source devices to detect 350 a detuned condition. In some implementations, the number of source devices used to detect a detuned condition (e.g., a grip condition) is modulated based on a classification of a radio frequency environment. For example, detecting 350 a detuned condition may include determining a classification (e.g., benign or challenging) of a radio frequency environment of the device (e.g., the device 102); and adjusting, based on the classification of the radio frequency environment, a number of source devices for which signal strengths are compared to detect the grip condition (e.g., the number of relevant source devices in the set to be considered). For example, where the relevant source devices are a GNSS satellites, the first signals received using the first antenna are L1 signals, and the second signals received using the second antenna are L5 signals, a grip condition may be detected if:

$$abs(cn0\_L1L5Delta\_Satellite\_k) > cn0\_delta\_threshold$$

for at least min_sv_count satellites above a minimum elevation angle, where cn0 delta threshold is a threshold. For example, the cn0 delta threshold may be 3 dB-Hz. For example, min_sv_count may be 4 in benign radio frequency signal environments and 2 in other environment types (e.g., dense urban environment). For example, the minimum elevation angle for satellites to be considered may be 60 degrees. In some implementations, if an L5 signal from a satellite is not tracking when the corresponding L1 signal indicates that it should be tracked, this can be treated as a comparison for the corresponding satellite that exceeds the threshold.

Detecting 350 a detuned condition for the device may include implementing hysteresis in a detector for the detuned condition (e.g., a grip condition). For example, detecting 350 the detuned condition of the device including the first antenna and the second antenna may be based on multiple comparisons of signal strength of the first signal with the second signal performed over a window of time (e.g., 1 second, 2 seconds, 5 seconds, or 10 seconds). In some implementations, a level of hysteresis in a grip condition detector may be modulated based on an activity state (e.g., walking, running, driving, or resting) determined for the device. For example, detecting 350 the detuned condition of the device (e.g., the device 102) may include determining an activity state of the device including the first antenna and the second antenna; and adjusting a duration of the window of time based on the activity state.

The process 300 includes, responsive to detection of the detuned condition, altering 360 a tuning state of the second antenna (e.g., the first antenna 110 or the second antenna 112). In some implementations, a tuning state of the second antenna may be altered 360 by selecting an alternative tuning network on a circuit board of the device or adjusting an impedance in a tuning network connected to the second antenna. For example, the tuning state may be altered 360 by disabling reception of the second signal using the second antenna. Disabling reception of the second signal using the second antenna may conserve power and or free up the second antenna for use in other applications that contend for time-shared use of the second antenna. For example, the second antenna may be tuned to receive L5 signals from GNSS satellites in a first mode and tuned to receive cellular network data signals in a second mode.

Step 360 of the process 300 is optional. In some implementations, detection of a grip condition may be used for other application specific purposes instead of or in addition to altering 360 the tuning of the second antenna. For example, a user interface of the device may be changed in response to a grip condition.

In some implementations, the process 300 is selectively performed based on an activity state of the device, which may help to conserve power usage in the device and reduce false positives of the detector by avoiding running the detector in activity states for which the detuned condition (e.g., a grip condition) is unlikely. For example, the first signal strength and the second signal strength may be compared 340 responsive to being in a grip detection mode that is entered based on an activity state of the device. For example, the process 400 of FIG. 4 may be implemented to enter a grip detection mode, during which the process 300 is performed. For example, the process 500 of FIG. 5 may be implemented to exit the grip detection mode, ending performance of the process 300 to check for the grip condition, thus saving power and avoiding false positives.

Figure 4:
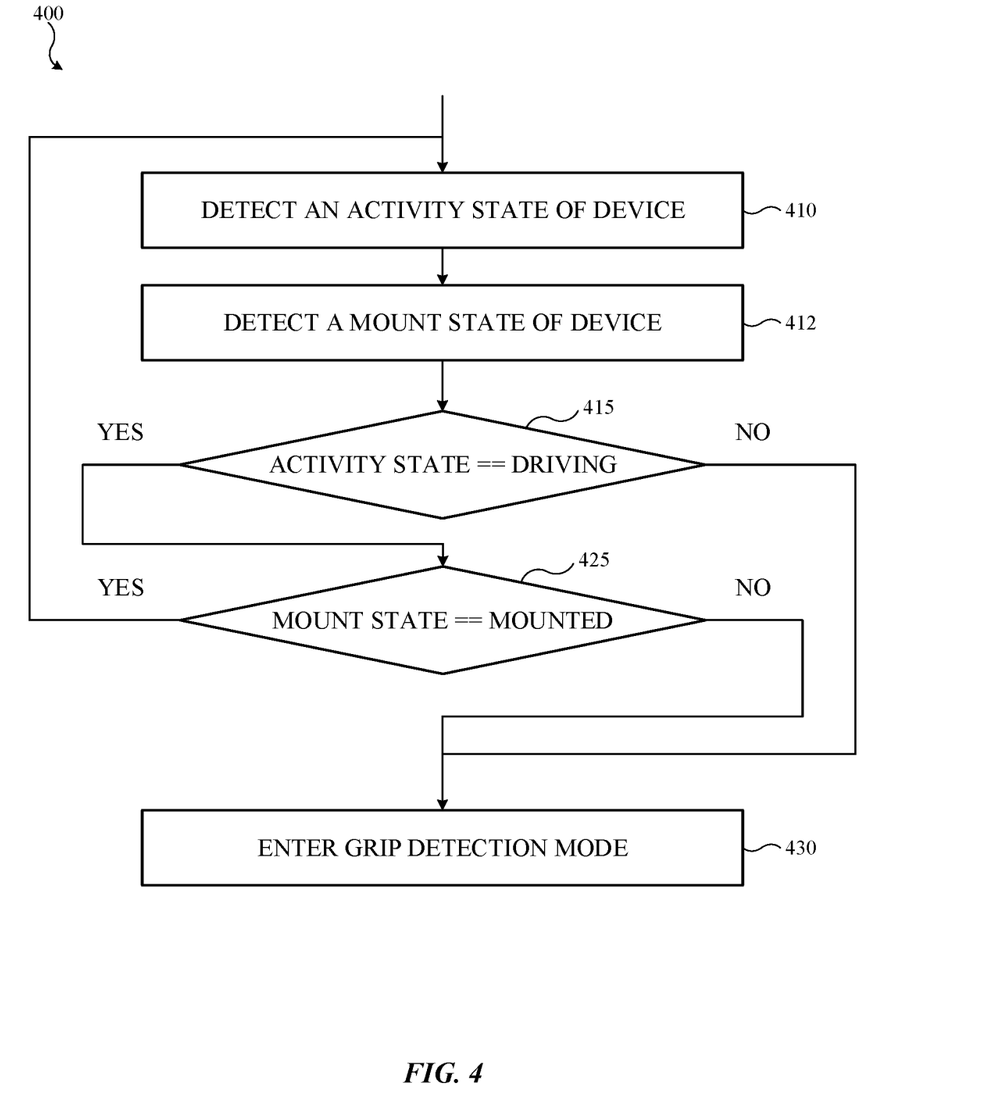
FIG. 4 is a flow chart of an example of a process for entering a grip detection mode.

FIG. 4 is a flow chart of an example of a process 400 for entering a grip detection mode. A grip condition may be unlikely in particular activity states and/or mounting states of a device. It may be advantageous to avoid checking for a grip condition while in such a state, and to resume checking for grip conditions while in states in which grip conditions occur more commonly. The process 400 may be performed while not in a grip detector mode to determine when the grip detector mode should be entered 430 to commence running a grip detection process (e.g., the process 200 of FIG. 2 or the process 300 of FIG. 3). For example, avoiding running a grip detection process while in a state where grip conditions are unlikely may save power and reduce false positives of a grip detection system. The process 400 includes determining 410 an activity state of the device including the first antenna and the second antenna; determining 412 a mount state of the device including the first antenna and the second antenna; if (at steps 415) the activity state is driving and (at step 425) the mount state is mounted, then remain in outside of a grip detection mode and continue executing the process 400 to continue checking for a state that should trigger the grip detection mode; and if (at step 415 or step 425) another activity state or mounting state is encountered, then entering 430 a grip detection mode based on the activity state and/or the mounting state. For example, the first signal strength and the second signal strength may be compared 230 responsive to being in the grip detection mode. For example, the process 400 may be implemented using the device 102 of FIG. 1.

Figure 5:
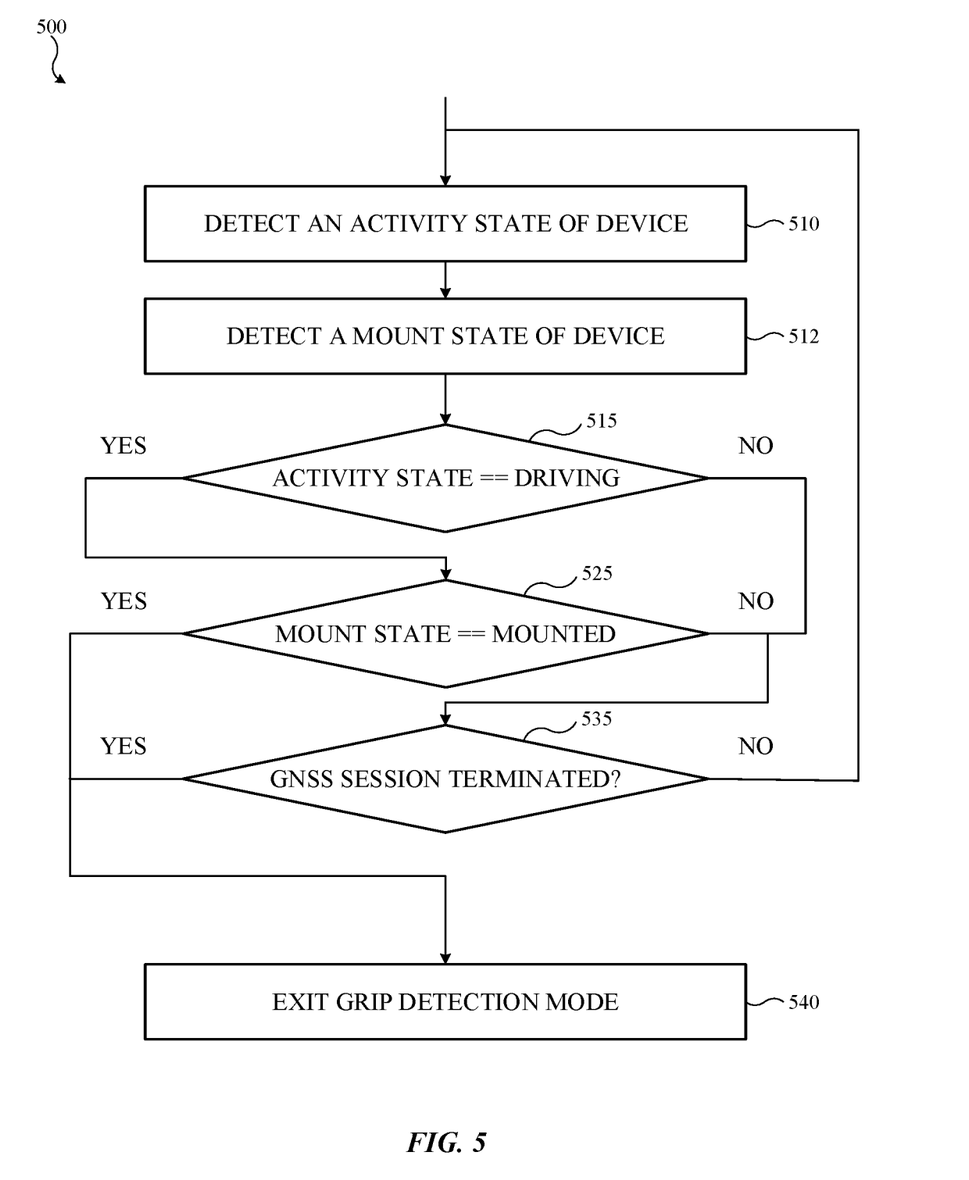
FIG. 5 is a flow chart of an example of a process for exiting a grip detection mode.

FIG. 5 is a flow chart of an example of a process 500 for exiting a grip detection mode. The process 500 may be performed while in a grip detector mode to determine when the grip detector mode should be exited 540 to stop running a grip detection process (e.g., the process 200 of FIG. 2 or the process 300 of FIG. 3). For example, avoiding running a grip detection process while in a state where grip conditions are unlikely may save power and reduce false positives of a grip detection system. The process 500 includes determining 510 an activity state of the device including the first antenna and the second antenna; determining 512 a mount state of the device including the first antenna and the second antenna; if (at steps 515) the activity state is driving and (at step 525) the mount state is mounted or (at step 535) a GNSS session or another application that depend on the grip detection function is terminated, then exit 540 the grip detection mode; and otherwise (at step 515 or step 525 or step 535) continue in the grip detection mode and continue executing the process 500 to continue checking for a state that should trigger an end to the grip detection mode. For example, comparisons of the first signal strength and the second signal strength may be stopped responsive to exiting the grip detection mode. For example, the process 500 may be implemented using the device 102 of FIG. 1.

FIG. 6 is a flow chart of an example of a process 600 for updating a signal strength offset parameter for a device including two antennas. The process 600 may be used to adapt the offset to the circumstances of a device (e.g., the device 102) as an individual device. For example, the tuning characteristics of the device may be impacted by variable factors, such as, whether a user keeps the device in a case and/or manufacturing tolerances of the device. The process 600 includes determining 610 a first signal strength of a first signal received using a first antenna from a source device; determining 620 a second signal strength of a second signal received using a second antenna from the source device; checking 630 for a tuned condition (e.g., a free space condition) based on the first signal strength and the second signal strength; if (at step 635) the device including the first antenna and the second antenna is in a tuned condition, then updating 640 an offset (e.g., a C/N0 offset) associated with the device including the first antenna and the second antenna based on measurements of signal strength of the first signal and the second signal taken during a tuned condition that is mutually exclusive with the grip condition; and, otherwise (at step 635) do nothing 650 to the offset for the device. For example, the process 600 may be implemented using the device 102 of FIG. 1. For example, a threshold of the detector may be adapted in a similar manner (i.e., using a process similar to the process 600).

In some implementations, it may be detected whether the device is in a case based on measurements used to adapt parameters of the detector. For example, certain levels of delta between signal strengths received with a first antenna and signal strengths received with a second antenna may indicate that a user has inserted their device (e.g., a smartphone or a tablet) in a case. For example, a case may be detected based on adaptive changes to parameters of a grip detection algorithm, such as changes to an offset determined using the process 600 of FIG. 6.

As described above, one aspect of the present technology is the gathering and use of data available from various sources to improve a user experience by improving performance and reliability of handheld device applications that rely of reception of signals using an antenna of the handheld device. The present disclosure contemplates that in some instances, this gathered data may include personal information data that uniquely identifies a specific person. Such personal information data can include grip condition frequencies and patterns, activity states, wireless access point identifiers, case identifiers, demographic data, location-based data, telephone numbers, email addresses, home addresses, or any other identifying or personal information. Data may be stored locally on a device or transmitted to a server for analysis.

The present disclosure recognizes that the use of such personal information data, in the present technology, can be used to the benefit of users. For example, the personal information data can be used to better design future products by arranging components including antennas in ways to mitigate impacts on user experience given user usage patterns, such as grip frequency and case usage for a handheld computing device. Thus, the use of some limited personal information may enhance a user experience. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of handheld mobile computing, the present technology can be configured to allow users to select to "opt in" or "opt out" of participation in the collection of personal information data during registration for services or anytime thereafter. In another example, users can select not to provide grip frequency, activity state, mounting state, and case usage data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, grip frequency and activity states can be determined by inferring preferences based on non-personal information data or a bare minimum amount of personal information, such as averages of past usage data, other non-personal information available to the handheld computing services, or publicly available information.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A handheld computing device comprising:
   a first antenna for receiving a first signal from a first source device and a second signal from a second source device;
   a second antenna for receiving a third signal from the first source device and a fourth signal from the second source device; and
   a processing apparatus configured to
       compare a first signal strength associated with the first signal with a second signal strength associated with the third signal,
       compare a third signal strength associated with the second signal with a fourth signal strength associated with the fourth signal, and
       detect a detuned condition for the handheld computing device based on the comparison of the first signal strength with the second signal strength and the comparison of the third signal strength with the fourth signal strength.

2. The handheld computing device of claim 1, wherein the processing apparatus is configured to,
   responsive to detection of the detuned condition, alter a tuning state of the second antenna.

3. The handheld computing device of claim 2, wherein the tuning state is altered by disabling reception of the third signal using the second antenna.

4. The handheld computing device of claim 1, wherein the detuned condition indicates that a human hand is holding the handheld computing device.

5. The handheld computing device of claim 1, wherein the first source device is a satellite of a global navigation satellite system.

6. The handheld computing device of claim 5, wherein the first signal is an L1 signal of the global navigation satellite system and the third signal is an L5 signal of the global navigation satellite system.

7. The handheld computing device of claim 1, wherein the second source device is an access point of a wireless communications network.

8. The handheld computing device of claim 1, wherein the processing apparatus is configured to
   determine a classification of a radio frequency environment of the handheld computing device, and
   adjust, based on the classification of the radio frequency environment, a number of source devices for which signal strengths are compared to detect the detuned condition.

9. The handheld computing device of claim 1, wherein the processing apparatus is configured to detect the detuned condition of the handheld computing device based on multiple comparisons of signal strength of the first signal with the third signal performed over a window of time.

10. The handheld computing device of claim 9, wherein the processing apparatus is configured to
    determine an activity state of the handheld computing device, and
    adjust a duration of the window of time based on the activity state.

11. The handheld computing device of claim 1, wherein the processing apparatus is configured to
    determine an activity state of the handheld computing device, and
    enter a detuning detection mode based on the activity state, wherein the first signal strength and the second signal strength are compared responsive to being in the detuning detection mode.

12. The handheld computing device of claim 1, wherein comparing the first signal strength to the second signal strength includes subtracting, on a logarithmic scale, an offset associated with the handheld computing device from a difference of the first signal strength and the second signal strength, and the processing apparatus is configured to
    update the offset associated with the handheld computing device based on measurements of signal strength of the first signal and the third signal taken during a tuned condition that is mutually exclusive with the detuned condition.

13. A method comprising:
    determining a first signal strength of a first signal received using a first antenna from a source device;
    determining a second signal strength of a second signal received using a second antenna from the source device;
    comparing the first signal strength with the second signal strength;
    detecting a detuned condition for a device including the first antenna and the second antenna based on the comparison of the first signal strength with the second signal strength;
    determining an activity state of the device including the first antenna and the second antenna; and
    entering a grip detection mode based on the activity state, wherein the first signal strength and the second signal strength are compared responsive to being in the grip detection mode.

14. The method of claim 13, comprising:
    responsive to detection of the detuned condition, altering a tuning state of the second antenna.

15. The method of claim 14, wherein the tuning state is altered by disabling reception of the second signal using the second antenna.

16. The method of claim 13, wherein the detuned condition is a grip condition indicating that a human hand is holding the device including the first antenna and the second antenna.

17. The method of claim 16, comprising:
responsive to the grip condition, generating, in a user interface of the device including the first antenna and the second antenna, feedback to a user to prompt the user to grip the device including the first antenna and the second antenna in different way.

18. The method of claim 13, wherein the source device is a satellite of a global navigation satellite system.

19. The method of claim 18, wherein the first signal is an L1 signal of the global navigation satellite system and the second signal is an L5 signal of the global navigation satellite system.

20. The method of claim 13, wherein the source device is an access point of a wireless communications network.

21. The method of claim 13, wherein the source device is a first source device, and the method comprises:
determining a third signal strength of a third signal received using the first antenna from a second source device;
determining a fourth signal strength of a fourth signal received using the second antenna from the second source device;
comparing the third signal strength with the fourth signal strength; and
detecting the detuned condition for the device including the first antenna and the second antenna based on the comparison of the third signal strength with the fourth signal strength.

22. The method of claim 13, wherein detecting the detuned condition of the device including the first antenna and the second antenna is based on multiple comparisons of signal strength of the first signal with the second signal performed over a window of time.

23. The method of claim 13, comprising:
detecting whether the device including the first antenna and the second antenna is in a case based on measurements used to adapt a parameter of a detector used to detect the detuned condition.

24. A handheld computing device comprising:
a first antenna for receiving a first signal from a source device;
a second antenna for receiving a second signal from the source device; and
a processing apparatus configured to
compare a first signal strength associated with the first signal with a second signal strength associated with the second signal,
detect a grip condition for a device including the first antenna and the second antenna based on the comparison of the first signal strength with the second signal strength,
determine a classification of a radio frequency environment of the handheld computing device, and
adjust, based on the classification of the radio frequency environment, a number of source devices for which signal strengths are compared to detect the grip condition.

* * * * *